Aug. 24, 1954  A. FLEISCH  2,687,128
METABOLIMETER
Filed July 7, 1950  3 Sheets-Sheet 1

INVENTOR:
ALFRED FLEISCH
By:
Hazeltine, Lake . C.
AGENTS

Aug. 24, 1954
A. FLEISCH
2,687,128
METABOLIMETER
Filed July 7, 1950
3 Sheets-Sheet 2
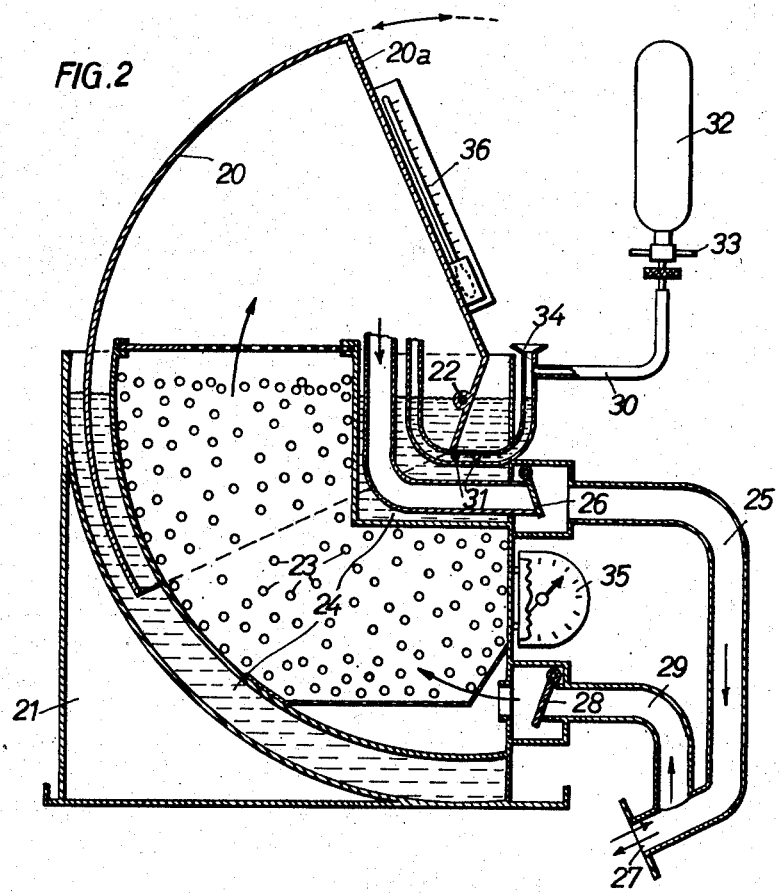
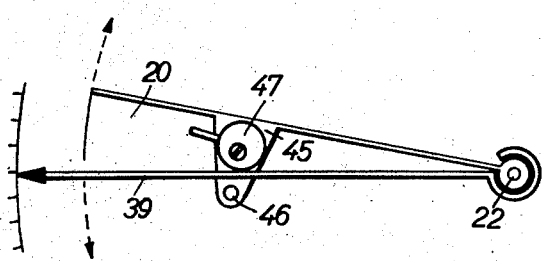
INVENTOR:
ALFRED FLEISCH Aug. 24, 1954

A. FLEISCH
METABOLIMETER 2,687,128

Filed July 7, 1950

INVENTOR:
ALFRED FLEISCH
By
Hazeltine, Lake & C.
AGENTS

Patented Aug. 24, 1954

2,687,128

UNITED STATES PATENT OFFICE 2,687,128

METABOLIMETER

Alfred Fleisch, Lausanne, Switzerland

Application July 7, 1950, Serial No. 172,410

Claims priority, application Switzerland
August 19, 1949

6 Claims. (Cl. 128—2.07)

My present invention relates to improvements in metabolimeters for determining the human basal metabolism factor by measuring the oxygen consumption.

For determining the human basal metabolism, it is conventional to measure the oxygen consumption in a certain time, e. g. in ten minutes.

These methods will indicate the volume of oxygen consumed in a given length of time, but such volume has to be reduced to normal conditions, i. e. to 0° C. dryness and 760 mm. barometric pressure; for only under these conditions one liter of consumed oxygen corresponds to the standard of 4.825 calories. What is desired, however, is the number of calories supplied by the best person in 24 hours. Such conversion of the oxygen volume to normal conditions is time-consuming for physicians and laboratory staff and rather complicated so as to give rise to errors, whilst the use of nomograms requires considerable practice. It would be a great advantage, therefore, if any conversion could be avoided.

The main object of my present invention is to provide a mechanical means adapted to furnish the number of calories per 24 hours directly, i. e. without any conversion, on the basis of the deflections of the spirometer bell. According to whether the breathing curve is to be recorded or not, one or the other of two different mechanical means is used.

The apparatus according to my invention comprises a spirometer, a vessel for absorbing the carbon dioxide, and a measuring device including adjusting means for reducing the oxygen consumption value to dry air of 0° C. and 760 mm. Hg and a scale for directly determining the number of calories for 24 hours corresponding to such reduced consumption value.

Two forms and a modification of my present invention are schematically shown in the accompanying drawing, in which—

Figure 3:
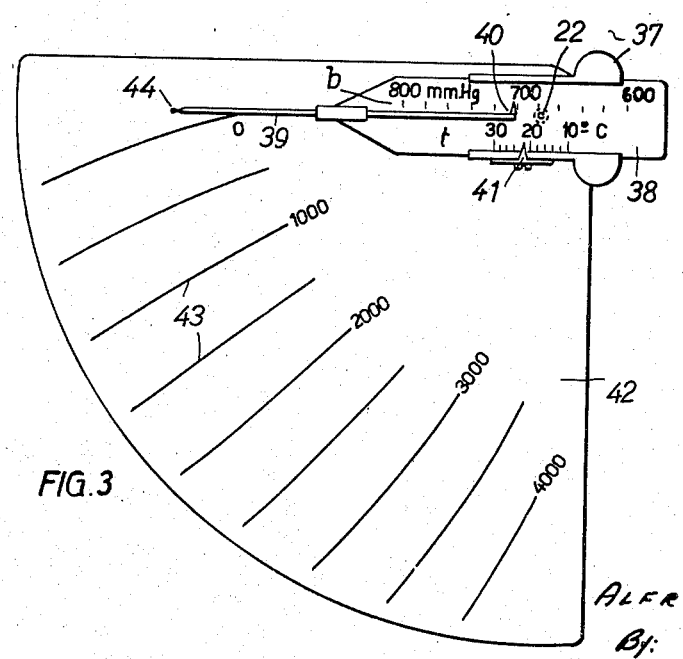

Fig. 2 a second form,

Fig. 3 the measuring device of such second form,

Fig. 4 a modification of part of the said measuring device, and

Figure 5:
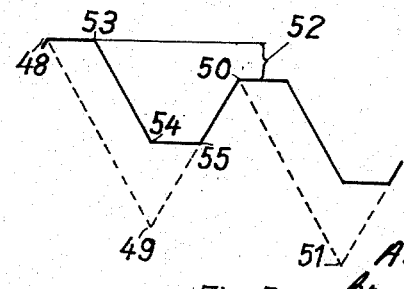

Fig. 5 shows in dash lines part of the recorded movement of the spirometer bell during a test, and in full lines the corresponding movement recorded with the aid of the modification shown in Fig. 4.

Figure 1:
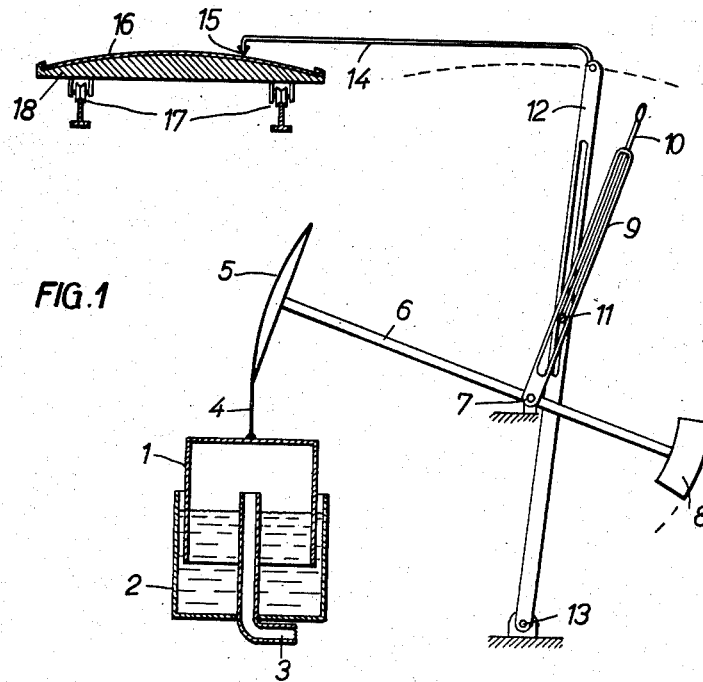
Fig. 1 shows a first form in elevation, partly in section.

In Fig. 1 a metabolimeter is shown, of which the cylindrical, oxygen-filled spirometer comprises a bell 1 immersed in a vessel 2 containing water, through which the inhaling-and-exhaling line 3 passes, which line in turn opens into the spirometer bell 1. A cord 4 attached centrally to the ceiling of the spirometer bell, connects the bell 1 to a measuring device. The connecting link 5 is shaped like a circle segment in cross-section and is secured to a two-arm lever 6 at right angles to the axis thereof, which lever is fulcrumed at 7. In order to counterbalance the weight of the parts 1 and 4–6 with respect to pivot 7, a counterweight 8 is secured to the free end of arm 6. A third arm 9 is rigidly connected to arm 6 at right angles thereto, being pivoted at 7 and slotted to receive an axially movable setting control tongue 10. A cross pin 11 is rigidly secured to the lower end of tongue 10 and engaged in a groove of a swinging arm 12. The latter is pivoted at one end on a fixed bearing pin 13 and at the other end, to a pointer 14. The stylus 15 of the latter is slidably disposed over a writing pad 16 which is mounted on a carriage 18 which is movable on rollers 17 transversely of the direction of movement of pointer 14.

Figure 1A:
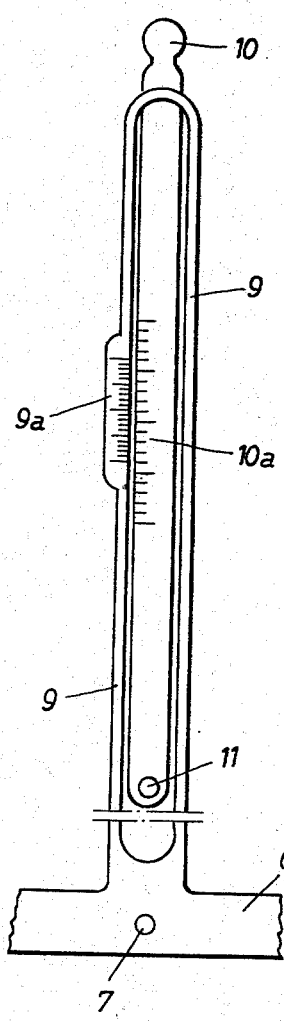
Fig. 1a shows a detail of Fig. 1 on a larger scale.

The means for reducing the value of oxygen consumption to dryness, 0° C. and 760 mm. barometric pressure, are shown in Figure 1a. A temperature scale 9a is provided on arm 9 for co-operation with a barometric scale 10a provided on slide 10, the latter being axially movable on arm 9. For adjustment to dry air at 0° C. and 760 mm. barometric pressure the mark on scale 10a showing the prevailing barometric pressure is brought into alignment with the mark on scale 9a showing the prevailing temperature by axially moving the slide 10.

The mode of operation of the apparatus described, otherwise is as follows:

On inhaling, oxygen is abstracted from the spirometer bell 1 through line 3, while the carbon dioxide of the air returning into the bell 1 on exhaling, is chemically absorbed. By reason of the increasing oxygen consumption, the bell 1 gradually sinks into the water vessel 2, i. e. the bell 1 on inhaling moves downwardly for a certain amount, and on exhaling it moves upwardly for a smaller amount. The said movements are transmitted through the connecting link 5 and lever 6 onto the arm 9, and thence by the cross-pin 11 of tongue 10 through the swinging arm 12 onto the pointer 14 and the pointer tip 15. The latter in accordance with the transmitted movement of bell 1, slides across the writing pad which moves at constant speed, and produces on said pad an ascending sawtooth curve as shown by the dash lines 48–49–50–51 in Fig. 5. The position of the lower kinks 49, 51 of said curve with respect to a corresponding scale of said pad affords a direct reading of the 24-hour calorie number corresponding to the oxygen consumption. In order to reduce the oxygen-consumption figure to dryness, 0° C., and 760 mm. Hg, the tongue 10 carrying the barometric scale is so displaced in the bell-crank 9, prior to commencement of the test, that the existing barometric pressure falls on that graduation of the temperature scale which corresponds to the existing temperature. Since such adjustment causes a corresponding resetting of cross-pin 11 with respect to its axial distance in arm 9 and to its axial distance in the groove of the slewing arm 12, the transmission ratio of the parts 9 and 12 of the measuring device and, thus, the excursion of the sawtooth curve with respect to the said scale of pad 16 is conformed to the said conditions of dryness, 0° C. and 760 mm. barometric pressure.

In order to decrease the weight of the apparatus and, thus, to render it portable, the recording of the movement of the spirometer bell may be replaced by direct reading. Such portable form of my invention is shown in Fig. 2 and comprises a spirometer bell 20 which in cross-section is of circular sector shape. The said bell is pivoted on a pin 22 to an absorption vessel 21. The latter partly is filled with soda lime 23 for absorbing the carbon dioxide of the exhaled air, and comprises a water vessel 24 conforming in shape to bell 20, the water serving for sealing the bottom opening of bell 20. Since the spirometer bell 20 shown in Fig. 2 constitutes a quarter of a circular cylinder, it may be swung in vessel 24 through 90°, i. e. between the horizontal and vertical positions of the ceiling 20a of bell 20, and such swinging movement may be limited by stops or dogs. A suction line 25 comprising a valve 26 and opening in an orifice 27, runs from the oxygen-filled bell 20 through the upper portion of vessel 24. The orifice 27 through an exhaling line 29 which comprises a valve 28 and passes through the vessel 21, is connected to the inside of bell 20.

Before starting a test, the bell 20 is filled with oxygen from flask 32 through a pipe 30 having a U-shaped portion disposed in the upper portion of vessel 24.

In order to prevent a further quantity of oxygen escaping from the flask 32 and flowing through the pipe 30 into bell 20 during a test which would adulterate the test results should the valve 33 leak, apertures 31 are provided in the U-shaped portion of the pipe 30. The flow of the oxygen into the bell 20 is prevented by the water in the vessel 24 which penetrates the apertures 31 and acts as a sealing means. Port 34 may be opened to permit the oxygen to flow out of the pipe 30.

A barometer 35 is attached to vessel 21, and a thermometer 36 to the ceiling 20a of bell 20.

The means for converting the oxygen-consumption values to dryness, 0° C. and 760 mm. barometric pressure, conditions and for reading the calorie number, are shown by way of example in Fig. 3. A rail 37 pivoted on the pivot axle 22 of bell 20 carries a scale 38 which is axially movable therein. A barometric graduation $b$ figured for conversion to 760 mm. Hg, and a temperature graduation $t$ are provided on scale 38. The latter further carries a pointer 39 which is movable along the barometric graduation $b$ and has a terminal mark 40 for co-operation with the graduation $b$, and a mark 41 secured to rail 37 is intended for co-operation with the temperature graduation $t$. Further, a reading disc 42 is pivoted on the common axle 22 of both bell 20 and rail 37, and carries a calorie graduation 42. The latter is intended for co-operation with a reading knob 44 of pointer 39, is valid for a test period of eight minutes for example, and allows to read off the 24-hour calorie number.

The mode of operation of the apparatus shown in Figs. 2 and 3 otherwise is as follows:

At the beginning of the test, the spirometer-bell 20 is filled with oxygen from flask 32 through line 30. The oxygen-consumption value is converted to dryness 0° C. and pressure conditions, for which purpose the scale 38 with its temperature graduation $t$ is moved, in accordance with the existing temperature, in rail 37 with respect to temperature mark 41, which procedure corresponds to a reduction of the oxygen temperature to 0° C. The pointer 39 or respectively, its terminal mark 40 is moved along the graduation $b$ in accordance with the barometric pressure, which procedure corresponds to a reduction of the oxygen pressure to 760 mm. Hg and dryness. The reading disc 42 then is turned about the axle pin 22 so that the knob 44 at the beginning of the test stands on the zero line of graduation 43. During the test, oxygen is taken from bell 20 through the nozzle 27 and line 25 and valve 26, whereupon the exhaled air flows back into bell 20 through line 29, valve 28 and through the soda-lime 23 which absorbs the carbon dioxide. The oxygen in bell 20 thus is rhythmically decreased, as in the preceding example, and the bell 20 is turned counterclockwise on the axle pin 22. The knob 44 thus moves rhythmically up and down across the scale 43. The exhaling position corresponding to the lower kinks of said sawtooth-curve in the preceding example, suitably is used as point of reading, since such position, as shown by the test, is much more constant than the inhaling position. After eight minutes of test, the position of knob 44 with respect to scale 43 is determined, whereby the 24-hour calorie number may be directly read off.

Owing to the continuous up-and-down movement of knob 44 in Fig. 3, the readings in the respective terminal positions are rendered difficut, whereby the accuracy of the reading may be impaired. In order to increase the reading accuracy, the pointer 39 may be connected to the pivot axle 22, and thus to the spirometer 20 by means as shown in Fig. 4 for example. An arm 45 is provided on bell 20 and comprises two stop pins 46 and 47 between which the pointer 39 is pivoted on the axle 22. During the reciprocating swing movement of the spirometer bell, the pointer 39 is taken along by the two spaced pins 46 and 47, whereby the knob 44 remains for a moment in its terminal positions, depending on the distance between the said pins. The extent of said distance and, thus, the duration of standstill of the pointer, may be varied by turning the pin 47 which is eccentrically mounted in arm 45.

By such means (Fig. 4) the usual saw-tooth line shown by the dash lines 48—51 in Fig. 5, is changed to the stepped line shown by the full lines 48, 53, 54, 55 and 56. The oxygen consumption during one breath is the same for both lines and corresponds to the distance 52 (Fig. 5), which for example may amount to 22 cc.

What I claim as new and desire to secure by Letters Patent is:

1. In a metabolimeter, a carbon dioxide absorption vessel, a spirometer comprising a bell of substantially sectorial cross-section, a water container defining a seal around the edge of the bell and means supporting the bell for pivoting movement in the container through at least 90°, and a measuring device comprising a carrier rail disposed in the pivoting axis of the bell, a slide scale including a barometric pressure graduation for dry air and a temperature graduation movable in said rail, a pointer on said scale movable along the barometric graduation, a terminal mark on said pointer cooperating with the barometric graduation, a mark on the rail cooperating with the temperature graduation, and a scale for directly reading the calorie number corresponding to the value of oxygen consumed in a 24 hour period for dry air at 0° C. and 760 mm. Hg.

2. A metabolimeter as in claim 1 wherein the calorie scale comprises a graduated disc dial pivotally mounted in the bell axis for adjustment relatively to the pointer.

3. In a metabolimeter, a spirometer comprising a bell adapted to be filled with oxygen, a water container defining a seal around the edge of said bell, carbon dioxide absorption means, an inhaling and exhaling tube connected to said bell and said carbon dioxide absorption means, means supporting said bell for movement in the container, and a measuring device including a pointer, means operatively connecting said pointer to said bell for actuation by movement of the latter in response to the consumption of oxygen from said bell and a scale cooperating with said pointer and directly indicating the calorie number corresponding to the value of oxygen consumed in a 24 hour period for dry air at 0° C. and a pressure of 760 mm. Hg, said connecting means having calibrating means therein for varying the extent of the movement of said pointer relative to said scale in response to movement of said bell thereby to provide compensation in the indication on said scale for whatever differences may exist between the actual temperature and pressure and said temperature of 0° C. and pressure of 760 mm. Hg.

4. In a metabolimeter; the combination according to claim 3; wherein said calibrating means includes relatively movable members which, when displaced with respect to each other, vary the extent of the movement of said pointer relative to said scale in response to movement of said bell, and cooperating scales and indices on said relatively movable members for establishing the relative positions of said members providing the necessary compensation for whatever differences exist between the actual temperature and pressure and said temperature of 0° C. and pressure of 760 mm. Hg.

5. In a metabolimeter, a spirometer comprising a bell having a cross-section of substantially sectorial outline adapted to be filled with oxygen, a water container defining a seal around the edge of said bell, carbon dioxide absorption means, an inhaling and exhaling tube connected to said bell and said carbon dioxide absorption means, means supporting said bell for swinging movement through at least 90°, and a measuring device including a pointer, means operatively connecting said pointer to said bell for actuation by movement of the latter in response to the consumption of oxygen from said bell and a scale cooperating with said pointer and directly indicating the calorie number corresponding to the value of oxygen consumed in a 24 hour period for dry air at 0° C. and a pressure of 760 mm. Hg, said connecting means including relatively movable members which, when displaced with respect to each other, vary the extent of the movement of said pointer relative to said scale in response to movement of said bell and cooperating scales and indices on said relatively movable members for establishing the relative positions of the latter providing the necessary compensation for whatever differences exist between the actual temperature and pressure and said temperature of 0° C. and pressure of 760 mm. Hg.

6. In a metabolimeter; the combination according to claim 5; wherein said pointer is supported for swinging about the same axis as said bell, and wherein said connecting means further includes two spaced stop pins moving with said bell and receiving said pointer therebetween to provide lost motion between said bell and said pointer.

References Cited in the file of this patent

UNITED STATES PATENTS

| Number | Name | Date |
|---|---|---|
| 1,550,335 | Benedict et al. | Aug. 18, 1928 |
| 1,677,147 | McKesson | July 17, 1928 |
| 1,863,929 | McKesson | June 21, 1932 |